G. F. WEYMOUTH.
Assignor to H. HOLT.
HAY KNIFE.
No. 10,715. Reissued Apr. 20, 1886.
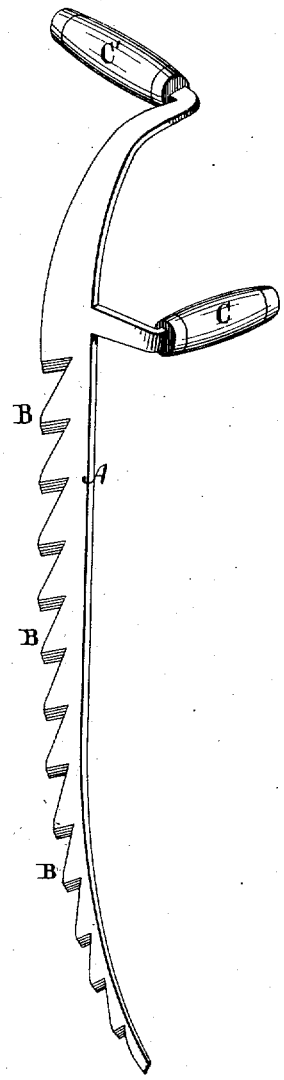
WITNESSES.
Julia W. Holt
Minnie E. Holt
INVENTOR.
Geo F. Weymouth
N. PETERS, Photo-Lithographer, Washington, D. C.

UNITED STATES PATENT OFFICE.

GEORGE F. WEYMOUTH, OF DRESDEN, ASSIGNOR TO HIRAM HOLT, OF WILTON, MAINE.

HAY-KNIFE.

SPECIFICATION forming part of Reissued Letters Patent No. 10,715, dated April 20, 1886.

Original No. 112,400, dated March 7, 1871; Reissue No. 10,072, dated April 4, 1882. Application for reissue filed March 26, 1886. Serial No. 196,740.

*To all whom it may concern:*

Be it known that I, GEORGE F. WEYMOUTH, of Dresden, in the county of Lincoln and State of Maine, have invented a new and useful Knife for Cutting Hay; and I do hereby declare that the following is a full and exact description thereof, reference being had to the accompanying drawing, and to the letters of reference thereon.

My invention consists of a long flat piece of steel in the shape of a sword, excepting the handles, with little knives on one edge, from the handle C to the point, the two handles C C′ standing out on one side, with which I thrust the knife A perpendicularly into the hay, working it up and down as I would a saw.

To enable others skilled in the art to make and use my invention, I will proceed to describe its construction and operation.

I make my knife about one inch in width and one-fourth inch in thickness at the handles, and quite thin at the point, crooked edgewise like a broadsword with tooth-like knives B, about an inch long on the outer edge or curve, their points inclining toward the point of the knife, as may be seen in the drawing, making a part of this specification, in which is represented the whole knife, which I call the "saw-knife." It may be any length required.

The purpose of the inclination of the knife-teeth or little knives is that they may feed themselves.

What I claim as my invention, and desire to secure by Letters Patent, is—

The improved hay-knife above described, consisting of the curved blade A, having knife-edged serrations B, and handles C C′, placed as shown, all substantially as specified.

GEO. F. WEYMOUTH.

Witnesses:
GEO. M. CURRIER,
JOS. C. HOLMAN.